United States Patent [19]
Steckbeck et al.

[11] Patent Number: 5,265,807
[45] Date of Patent: Nov. 30, 1993

[54] AERODYNAMIC STIFFENING RING FOR AN AIRCRAFT TURBINE ENGINE MIXER NOZZLE

[75] Inventors: James F. Steckbeck, San Diego; Sharad Naik, Chula Vista, both of Calif.

[73] Assignee: Rohr, Inc., Chula Vista, Calif.

[21] Appl. No.: 890,849

[22] Filed: Jun. 1, 1992

[51] Int. Cl.$^5$ .............................................. F02K 1/46
[52] U.S. Cl. .............................. 239/265.11; 181/213; 181/220
[58] Field of Search ...................... 239/265.11, 265.13; 181/212, 213, 220; 60/226.1, 230, 262, 264

[56] References Cited

U.S. PATENT DOCUMENTS

| | | | |
|---|---|---|---|
| 3,053,340 | 9/1962 | Kutney | 239/265.11 X |
| 3,084,505 | 4/1963 | Cherchi | 181/220 X |
| 3,092,205 | 6/1963 | Brown et al. | 181/213 |
| 3,647,021 | 3/1972 | Millman et al. | 239/265.13 X |
| 3,685,611 | 8/1972 | Duvvuri | 239/265.11 X |
| 4,335,801 | 6/1982 | Stachowiak et al. | 181/213 |
| 4,819,425 | 4/1989 | Farquhar et al. | 60/226.1 |

FOREIGN PATENT DOCUMENTS 226690 1/1960 Australia ....................... 239/265.11
885713 12/1961 United Kingdom ........... 239/265.11

Primary Examiner—Andres Kashnikow
Assistant Examiner—Lesley D. Morris
Attorney, Agent, or Firm—P. J. Schlesinger; Frank Gilliam

[57] ABSTRACT

A mixing nozzle for an aircraft turbine engine having an improved aerodynamic stiffening ring secured to the lobes of the mixer. Aircraft turbine engines having a rearwardly discharging nozzle are often provided with a mixer having a generally circular forward end adapted to be attached to an engine and axially deepening corrugations leading to a multi-lobed aft end surrounding the nozzle. This mixer mixes ambient cool air with the hot gases exiting the engine thus suppressing engine sound. The lobes are generally unsupported and subject to vibration and excessive deflections in use. A circumferential stiffening ring is secured to the aft end of the mixer to reduce or prevent the vibration while simultaneously enhancing the mixing of cool ambient air with the hot engine exhaust. The stiffening ring preferably has an airfoil cross-section for lowest drag combined with the ability to direct flow past the ring in a selected optimum direction.

5 Claims, 1 Drawing Sheet

000
AERODYNAMIC STIFFENING RING FOR AN AIRCRAFT TURBINE ENGINE MIXER NOZZLE

BACKGROUND OF THE INVENTION

This invention relates in general to aircraft gas turbine engines and, more particularly, to an improvement in a multi-lobe mixer nozzle for engine noise suppression and mixing of the engine hot core gasses with cool bypass air.

A number of different noise suppression and gas mixing nozzles have been developed for use with aircraft gas turbine engines, some to be independently attached to the engine around the engine exhaust nozzle and some combined with the nozzle. Typical of these are the systems described by Farquar et. al. in U.S. Pat. No. 4,819,425, by Kutney in U.S. Pat. No. 3,053,340 and Cherchi in U.S. Pat. No. 3,084,505. In each, the mixer is circular with tapered fore-and-aft corrugations forming a plurality of lobes giving a daisy-like appearance from the aft end. The aft end of the mixer is substantially unsupported and is subject to vibration and deflections induced by varying gas flow through the system and complex thermal growth that may shorten the system's life due to metal fatigue and result in varying sound suppression and gas mixing. Further, the mixing of cool and hot gases is less than desired.

Millman et. al. in U.S. Pat. No. 3,647,021 discloses a multi-lobed sound suppression shroud that includes triangular sound absorbing panels within the lobes exposed to the engine exhaust gasses and a ring supporting the aft end of the panels. While this arrangement increases sound suppression, it adds undesirable weight an drag to the system. The support ring does nothing to improve gas mixing. Significant thermal expansion mismatches may occur between the shroud, panels and ring.

Brown et. al. in U.S. Pat. No. 3,092,205 discloses a multi-lobed noise suppression system for aircraft gas turbine engines that includes a large number of short struts fastened across the lobes within the shroud. These struts are airfoil shaped and are positioned in alignment with the gas flow. Thus, while these struts have minimum drag, they do not enhance mixing of hot engine gases with cool bypass air. The large number of struts and their associated mounting plates tend to add undesired weight and are difficult and time consuming to install in the proper places with the required airflow alignment. Thermal expansion mismatches may occur between the shroud and struts.

Thus, there is a continuing need for improvements in noise suppressing, hot and cold gas mixing, mixer nozzles for aircraft gas turbine engines to reduce lobe vibration and deflection, to stabilize the mixer and improve mixing between hot engine exhaust gases and cool bypass air.

SUMMARY OF THE INVENTION

It is, therefore, an object of this invention to provide a noise suppressing, gas mixing multi-lobed mixer for aircraft gas turbine engines that overcomes the above-noted problems. Another object is to provide such a mixer having improved resistance to vibration and deflection when exposed to varying aerodynamic forces. A further object is to provide such a mixer providing flow directing means providing improved mixing of hot engine exhaust gases with cool bypass air and thereby decrease specific fuel consumption of the engine. Yet another object is to provide such a mixer system including a stiffener ring to support the lobes without causing thermal expansion mismatches with adjacent engine structures.

The above noted objects, and others, are accomplished in accordance with this invention by a mixer adapted to surround an aircraft turbine engine exit nozzle and configured to suppress noise and mix hot engine exhaust gases with cool bypass air. The mixer typically has a generally circular forward end adapted to be secured to the engine adjacent to the exhaust nozzle and having gradually deepening corrugations extending toward the aft end, terminating in a circular array of lobes. While the mixer is generally circular and symmetrical in overall configuration, depending on the aircraft engine, it may have non-symmetrical lobes to avoid fairing and pylons. One or more aerodynamically shaped stiffening rings are secured to the aft edges of the lobes. The rings may be secured at any suitable location from the innermost lobe edges to the outermost edges, preferably, however a single ring is attached to the outermost trailing lobe edges of the mixer. The ring or rings stiffen the structure to reduce acoustic vibration and air flow induced deflection of the lobes while simultaneously enhancing the mixing the engine's hot core gasses and cold bypass air to increase the available thrust. Although the ring causes a pressure loss from the drag, its exceptional ability to enhance hot and cold gas mixing results in increased thrust exceeding the lose from the drag.

The cross section of the ring is preferably shaped in a streamlined or airfoil shape and angled to direct air flow in a direction insuring maximum mixing of the hot and cold gases. The ring cross-section may have any suitable thickness and length, which will depend somewhat on the size of the engine and mixer being used. Typically, the ring cross-section will have a thickness of from 4 to about 6 mm. and a length of from about 25 to 30 mm. for a typical commercial jet engine having a thrust of 30,000 to 36,000 lbs. For an optimum combination of stiffening, hot and cold gas mixing with lowest drag, a single ring located at or near the outer edges of the lobes is preferred. To prevent thermal expansion mismatch the ring is preferably attached directly to the lobes. The particular dimensions disclosed hereinabove should be considered to be exemplary only and not limiting.

BRIEF DESCRIPTION OF THE DRAWING

Details of the invention, and of certain preferred embodiments thereof, will be further understood upon reference to the drawing, wherein.

DETAILED DESCRIPTION OF PREFERRED EMBODIMENTS

Figure 1:
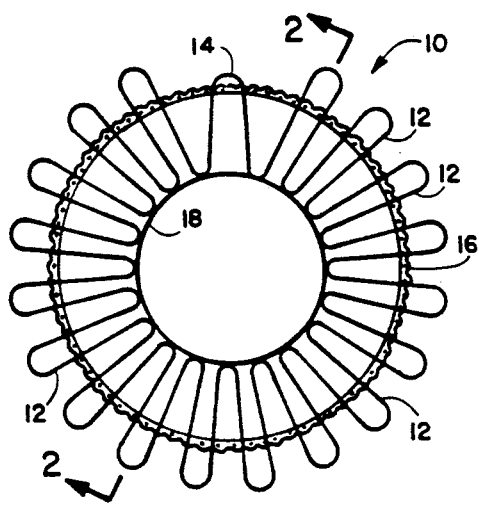
FIG. 1 is an elevation view of the aft end of a mixer with a central stiffening ring.
Figures 2, 3:
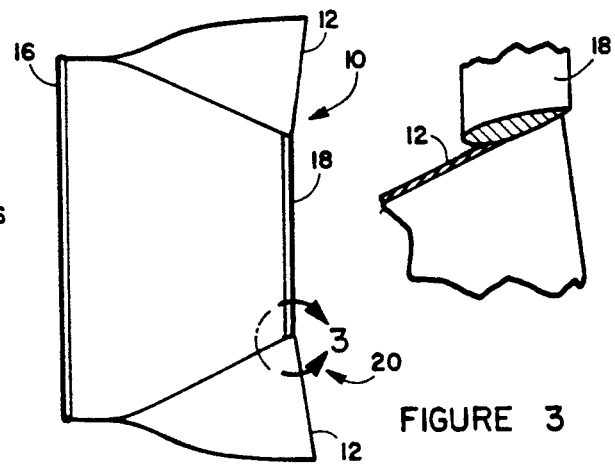
FIG. 2 is a section view taken on line 2—2 in FIG. 1.
FIG. 3 is a detail section view through the stiffening ring of FIGS. 2 and 3.

Referring now to FIGS. 1 and 2, there is seen the aft end of a multi-lobed shroud 10 having a plurality of radially arranged lobes 12. A shorter lobe 14 is provided at the top of the mixer to accommodate the engine pylon. A mounting ring 16 is provided at the forward end of shroud 10 for attachment to the engine, such as by a plurality of bolts.

A stiffening ring 18, concentric with the centerline of mixer 10 is in this embodiment fastened to the aft inner edges of lobes 12, that is, the edges closest to the shroud centerline. Ring 18 serves to both stabilize lobes 12 and guide cool bypass air toward the center of mixer nozzle and improve mixing with the hot core gases. As seen in a detail view corresponding to ares 20 in FIG. 2, ring 18 has a streamlined, in this case uniform, section and is angled parallel to the engine centerbody, preferably up to about 30° to the aft centerline of the mixer, to direct gases passing the ring toward the engine centerline, to improve mixing of the hot and cold gases.

Figure 4:
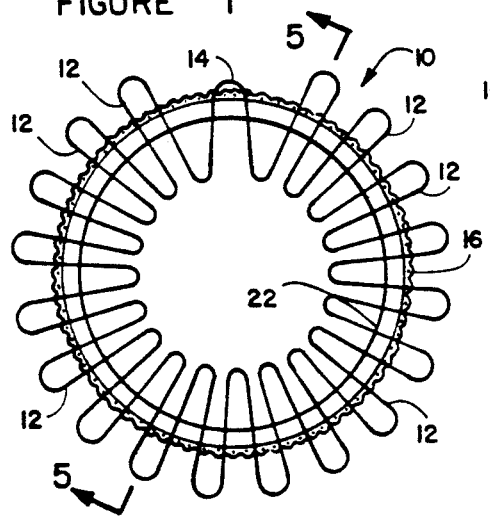
FIG. 4 is an elevation view of the aft end of a mixer with an intermediate stiffening ring.
Figures 5, 6:
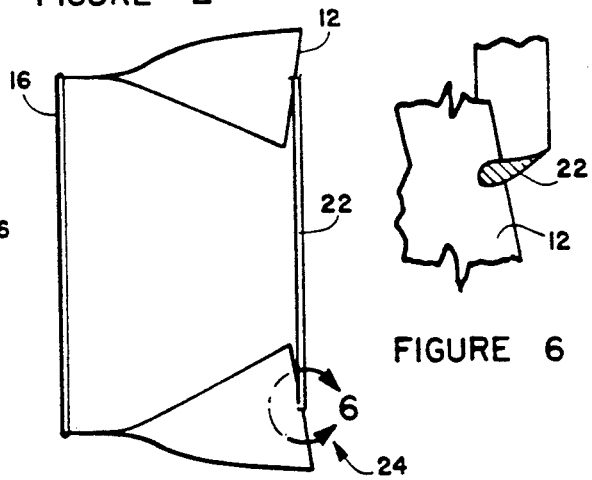
FIG. 5 is a section view taken on line 5—5 in FIG. 4.
FIG. 6 is a detail section view through the stiffening ring of FIGS. 4 and 5.

FIGS. 4 and 5 show an aft end view of the mixer 10, with lobes 12 and mounting ring 16 basically the same as in FIGS. 1 and 2. Here, however, a stiffening ring 22 is provided intermediate the inner and outer ends of lobes 12. Any suitable intermediate location may be selected. Ring 22 is angled to direct gases flowing past the ring toward the center of mixer 10 to improve mixing. Ring 22 may be secured to lobes 12 at the selected location in any suitable manner, such as by notching lobes 12 and welding or brazing the ring in place.

As seen in FIG. 6, which is a detail view of area 24 in FIG. 5, ring 22 may have an airfoil cross-section, preferably up to about 30° to the aft centerline of the mixer, to improve the deflection of gases toward the center of the mixer. Generally, superior gas mixing and stiffening of lobes occur with the intermediate location of ring 22 shown in FIGS. 4–6 than with the central location of ring 18 as shown in FIGS. 1–3.

Figure 7:
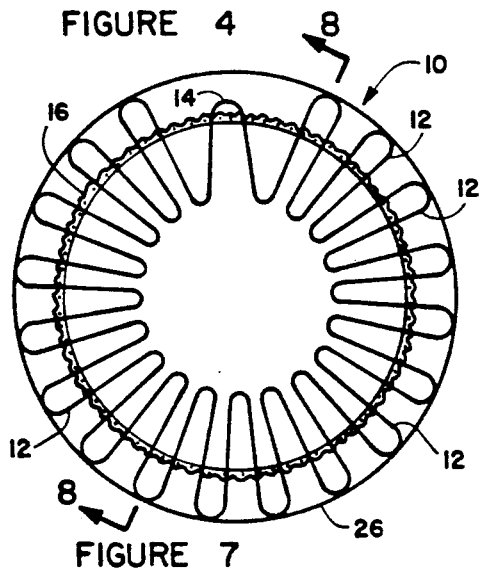
FIG. 7 is an elevation view of the aft end of a mixer with an outer stiffening ring.

FIGS. 7 and 8 again show an aft elevation view of a mixer 10 having a plurality of lobes 12 and a mounting ring 16. In this embodiment, a stiffening ring 26 is secured to the outer edges of lobes 12. Excellent stiffening and stabilization of lobes 12 against acoustic vibrations or other deflections are obtained with this location. Further more, the ring provides increased mixing of gases causing a more uniform temperature distribution at the exit of the engine exhaust nozzle.

Figures 8, 9:
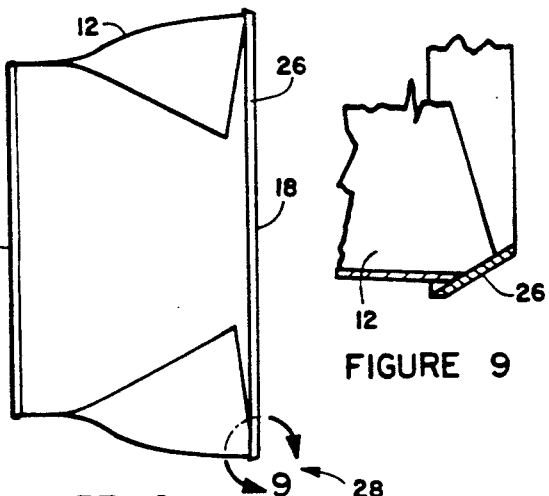
FIG. 8 is a section view taken on line 8—8 in FIG. 7.
FIG. 9 is a detail section view through the stiffening ring of FIGS. 7 and 8.

As seen in FIG. 9 which shows an enlarged detail view corresponding to area 28 in FIG. 8, ring 26 is secured to lobes 12 with the ring angled toward the aft centerline of the shroud. Ring 26 may be secured to lobes in any suitable manner, such as be trimming the outer lobe edges and welding or brazing ring 26 thereto. In this embodiment, ring 26 has a generally flat configuration, with the edges tapered along the outside to form a streamlined configuration. Preferably ring 26 lies at an angle of up to about 30° to the aft centerline of the mixer.

While each of the three embodiments shown in the drawing features the use of a single stiffening and gas mixing ring, two or more rings may be used if desired. Enhanced stiffening and gas mixing efficiency will be achieved with multiple rings, at the cost of greater weight and drag. Where two rings are used together, they are preferably located at the outer and inner locations described above with an outer ring 26 and an inner ring 18 as seen in FIG. 8.

While not completely understood it has been found that the present invention in addition to stiffening the lobes of the mixer in an advantageous manner with the attendant advantages, also decreases the specific fuel consumption of the engine. It wa anticipated that the provision of the stiffening ring of the present invention would slightly increase the specific fuel consumption of the associated engine. However, it was found in actual practice that the exact converse was true, namely that the specific fuel consumption was decreased. It is believed that this unexpected phenomenon is due to an improved mixing of the hot and cold gasses.

Other applications, variations and ramifications of this invention will occur to those skilled in the art upon reading this disclosure. Those are intended to be included within the scope of this invention, as defined in the appended claims.

We claim:

1. In a thrust efficient noise suppression mixer shroud for use with aircraft gas turbine engines which has a generally circular forward end adapted to be secured to an aircraft engine, a plurality of radially arranged, axially deepening corrugations leading to a multi-lobed aft end adapted to surround an engine exit nozzle, the improvement comprising:
   - a first continuous, generally circular, stiffening ring substantially coaxial with said shroud;
   - said first stiffening ring secured to the outer edges of said lobes;
   - a second continuous, generally circular, stiffening ring substantially coaxial with said shroud;
   - said second stiffening ring secured to the inner edges of said lobes; and
   - at least one of said rings having a streamlined cross-section extending rearwardly of said mixer shroud and inwardly toward the centerline of said mixer shroud at an angel of up to about 30° to the centerline of said mixer shroud.

2. The improvement according to claim 1 wherein said first ring has a streamlined cross-section extending rearwardly of said mixer shroud and inwardly toward the centerline of said mixer shroud at an angle of up to about 30° to the centerline of said mixer shroud.

3. The improvement according to claim 1 wherein said second ring has a streamlined cross-section extending rearwardly of said mixer shroud and inwardly toward the centerline of said mixer shroud at an angle of up to about 30° to the centerline of said mixer shroud.

4. The improvement according to claim 1 wherein each of said first and second rings has a streamlined cross-section extending rearwardly of said mixer shroud and inwardly toward the centerline of said mixer shroud at an angle of up to about 30° to the centerline of said mixer shroud.

5. The improvement according to claim 1 wherein the cross-section each of said first and second rings has a width of from about 4 to 6 mm and a length of from about 25 to 30 mm.

* * * * *